April 22, 1952     A. A. WILSON     2,593,824
TIRE DEFLATION RESPONSIVE SWITCH
Filed Nov. 16, 1949
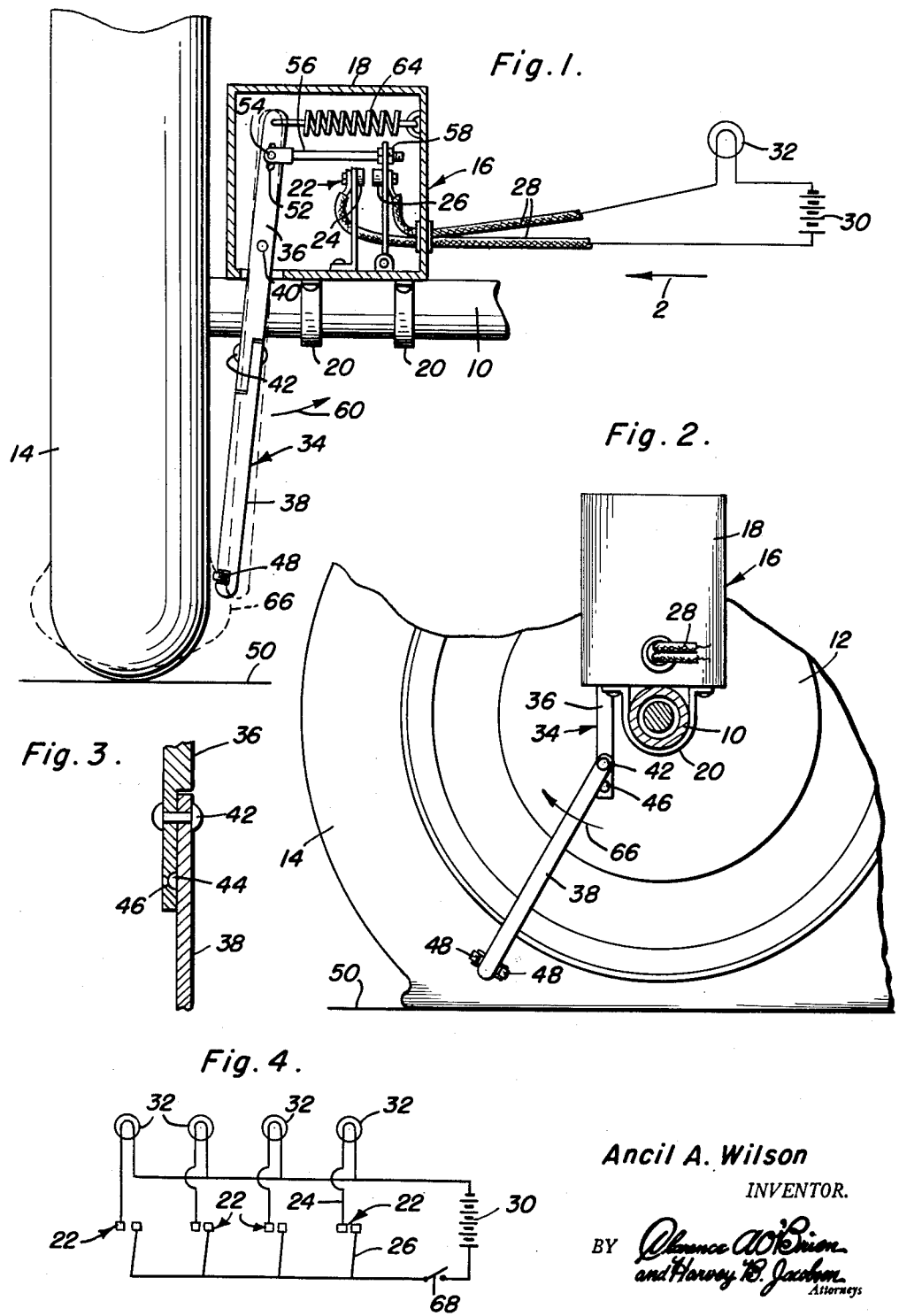
Ancil A. Wilson
INVENTOR.

Patented Apr. 22, 1952

2,593,824

UNITED STATES PATENT OFFICE 2,593,824

TIRE DEFLATION RESPONSIVE SWITCH

Ancil A. Wilson, San Bernardino, Calif.

Application November 16, 1949, Serial No. 127,680

1 Claim. (Cl. 200—58)

This invention relates to new and useful improvements and structural refinements in deflation warning devices for pneumatic tires on vehicles, such as automobiles, trucks, buses, etc., the principal object of the invention being to attract the attention of the operator of the vehicle when any one of the several tires sustain a loss of pressure, thus contributing greatly to the safety of driving as well as to the life of the tires themselves.

In particular, the invention concerns itself with the provision of means for actuating a warning signal, which means are responsive to the usual spreading of the lower portion of a pneumatic tire when the air pressure therein is reduced, some of the advantages of the invention residing in its simplicity of construction, in its dependable operation, and in its adaptability for use on vehicles of different sizes and types.

With the above more important objects and features in view and such other objects and features as may become apparent as this specification proceeds, the invention consists essentially in the arrangement and construction of parts as illustrated in the accompanying drawings, in which:

Figure 1 is an elevational view of a vehicle axle and tire showing the invention, in cross-section, associated therewith;

Figure 2 is an inside elevational view, taken in the direction of the arrow 2 in Figure 1, but illustrating the tire as being almost fully deflated;

Figure 3 is a cross-sectional detail of an actuating arm used in the invention; and Figure 4 is a wiring diagram of the electrical components used therein.

Like characters of reference are employed to designate like parts in the specification and throughout the several views.

Referring now to the accompanying drawings in detail, the reference character 10 designates the usual rear axle housing of an automotive vehicle, the same being provided with a rotatable wheel 12 equipped with a pneumatic tire 14, the invention residing in the provision of a warning device designated generally by the reference character 16 which embodies in its construction a housing 18 secured by suitable clamps 20 to the rear axle housing 10, as is best shown in Figures 1 and 2.

The housing 18 contains an electric switch 22 which includes a stationary contact member 24 and a coacting contact member 26 which is movable toward and away from the stationary member 24, so as to respectively close and open the circuit through the switch, as will be clearly understood. The switch 22 is connected by suitable conductors 28 in series to a source of current 30 and to a suitable warning means 32 such as a lamp or bell, preferably disposed in the operator's compartment or on the instrument panel of the vehicle on which the invention is installed.

A switch actuating arm 34 extends downwardly from the housing 18 through a slot 36 with which the bottom of the housing is provided, the arm 34 consisting of an upper section 36 and a lower section 38. The upper section 36 of the arm 34 is mounted upon a pivot element or pin 40 which is provided in the housing 18 and has the axis thereof parallel to the plane of rotation of the wheel 12, while a second pivot pin 42 connects the section 38 to the section 36 and is disposed substantially at right angles to the pin 40, that is, the pin 42 is so disposed that the section 38 may be swung relative to the section 36 in a plane which is substantially parallel to the plane of rotation of the wheel.

The upper end portion of the section 38 is provided with a semispherical detent 44 which is receivable in a complementary recess 46 provided in the lower portion of the section 36 (see Figure 3), whereby the two sections are releasably locked in longitudinal alignment.

The lower end portion of the section 38, in turn, carries a pair of rotatable rollers 48 which are adapted to engage the inner side wall of the tire 14 adjacent the ground indicated at 50, while the upper section 36 of the arm 34 is provided with a plurality of apertures 52 to selectively receive a pin or bolt 54 whereby a link 56 is pivotally connected to the arm. The link 56 is also connected, as at 58, to the movable member 26 of the switch 22, and it will be apparent from the foregoing that when the arm 34 as a whole is swung in the direction of the arrow 60 about the pivot 40, the contact members 24, 26 of the switch 22 will be brought together, thus completing the electrical circuit to the signalling means 32. However, a tension spring 64 is anchored to the housing 18 and to the upper section 36 of the arm 34, whereby the contact members 24, 26 of the switch 22 are normally held in a separated position.

When the invention is placed in use and the tire 14 is properly inflated, the rollers 48 at the lower end of the arm 34 will not engage the tire, but as soon as the air pressure in the tire is decreased by leakage, or the like, the bottom portion of the tire will spread laterally, as indicated at 66, and, by bearing against the rollers 48 the arm 34 as a whole will be swung in the direction of the arrow 60, thus closing the switch 22 and energizing the signalling means 32.

It will be apparent that in order to be effective, the rollers 48 must engage the tire 14 close to the ground 50, and it is therefore evident that in instances where the deflation of the tire is excessive or complete, the lower end of the arm section 38 will come in contact with the ground. Under such circumstances, this engagement will be sufficiently powerful to unseat the detent 44 from the recess or socket 46, and the lower section 38 will simply swing rearwardly relative to the upper section 36 (see 66 in Figure 2) so that any possible damage to the arm 34 will be prevented.

The adjustment facilitated by the selective positioning of the pivot 54 in the aperture 52 of the arm will assure proper closing of the switch members 24, 26, and it is to be understood that the invention may be applied to each of the several wheels of a vehicle by simply repeating the arrangement already described and introducing the additional switches 22 and warning units 32 in parallel with the original switch and warning unit for actuation by a common source of power 30, as shown in Figure 4. Moreover, a cut-off switch 68 of a manual type may be introduced into the circuit for rendering the entire warning means inoperative when so desired.

It is believed that the advantages and use of the invention will be clearly apparent from the foregoing disclosure and, accordingly, further description thereof at this point is deemed unnecessary.

Having described the invention, what is claimed as new is:

In a vehicle, an axle and a rotatable wheel including a pneumatic tire rotatably mounted on the axle, a housing mounted on the axle adjacent the wheel, an elongated switch actuating arm pivotally mounted within the housing for movement towards and away from the tire, said arm projecting downwardly from the housing and terminating adjacent one side of the pneumatic tire, a fixed electrical contact in the housing and a second electrical contact in the housing movable towards and away from the fixed contact in the plane of movement of the arm, a link disposed entirely within the housing connecting the arm and the second contact to move the latter upon movement of the arm, and spring means in the housing for biasing said contacts apart.

ANCIL A. WILSON.

REFERENCES CITED

The following references are of record in the file of this patent:

UNITED STATES PATENTS

| Number | Name | Date |
|---|---|---|
| 2,317,509 | Anderson | Apr. 27, 1943 |
| 2,452,296 | Eslinger et al. | Oct. 26, 1948 |
| 2,461,299 | Sullivan | Feb. 8, 1949 |
| 2,469,931 | Pratt | May 10, 1949 |

FOREIGN PATENTS

| Number | Country | Date |
|---|---|---|
| 330,592 | Italy | Oct. 19, 1935 |
| 762,936 | France | Jan. 29, 1934 |